US010521670B2

(12) United States Patent
Simske et al.

(10) Patent No.: US 10,521,670 B2
(45) Date of Patent: Dec. 31, 2019

(54) VIDEO CONTENT SUMMARIZATION AND CLASS SELECTION

(71) Applicant: Hewlett-Packard Development Company, L.P., Spring, TX (US)

(72) Inventors: Steven J Simske, Fort Collins, CA (US); Tong Zhang, Palo Alto, CA (US); Manav Das, Downers Grove, IL (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 36 days.

(21) Appl. No.: 15/764,280

(22) PCT Filed: Oct. 30, 2015

(86) PCT No.: PCT/US2015/058438
§ 371 (c)(1),
(2) Date: Mar. 28, 2018

(87) PCT Pub. No.: WO2017/074448
PCT Pub. Date: May 4, 2017

(65) Prior Publication Data
US 2019/0057258 A1  Feb. 21, 2019

(51) Int. Cl.
*G06K 9/00* (2006.01)
*H04N 21/466* (2011.01)
(Continued)

(52) U.S. Cl.
CPC ......... *G06K 9/00718* (2013.01); *G06F 16/71* (2019.01); *G06F 16/739* (2019.01);
(Continued)

(58) Field of Classification Search
None
See application file for complete search history.

(56) References Cited

U.S. PATENT DOCUMENTS 6,775,677 B1 * 8/2004 Ando ................. G06F 16/3347
707/739
7,599,554 B2 * 10/2009 Agnihotri .......... G06K 9/00711
382/173
(Continued)

FOREIGN PATENT DOCUMENTS

JP  2012-074759 A  4/2012
WO  2004025496 A1  3/2004
(Continued)

OTHER PUBLICATIONS

Bhat, Pravin, "Gradient-Domain Techniques for Image & Video Processing", Ph.D. Thesis, University of Washington, USA, 2009.
(Continued)

*Primary Examiner* — Fayyaz Alam
(74) *Attorney, Agent, or Firm* — Dicke Billig & Czaja PLLC (57) ABSTRACT

A system includes a plurality of summarization engines, each summarization engine to receive video content, via a processing system, and to provide a summary of the video content, thereby providing a plurality of summaries of the video content. The system includes a plurality of meta-algorithmic patterns, each meta-algorithmic pattern to be applied to at least two of the summaries to provide, via the processing system, a meta-summary of the video content using the at least two summaries, thereby providing a plurality of meta-summaries of the video content. The system includes an evaluator to evaluate the plurality of summaries and the plurality of meta-summaries and to determine similarity measures of the video content over each given class of a plurality of classes of video content, and to select a class of the plurality of classes based on the determined similarity measures.

15 Claims, 3 Drawing Sheets

(51) Int. Cl.
*H04N 21/8549* (2011.01)
*G06F 16/738* (2019.01)
*G06F 16/71* (2019.01)
*G06F 16/34* (2019.01)

(52) U.S. Cl.
CPC ..... *G06K 9/00751* (2013.01); *H04N 21/4665* (2013.01); *H04N 21/8549* (2013.01); *G06F 16/345* (2019.01); *G06K 2009/00738* (2013.01)

(56) References Cited

U.S. PATENT DOCUMENTS

| | | | |
|---|---|---|---|
| 7,630,562 | B2 | 12/2009 | Gong et al. |
| 7,809,792 | B2 | 10/2010 | Hirata et al. |
| 8,467,610 | B2 * | 6/2013 | Kumar ............... G06K 9/00751 382/195 |
| 8,989,503 | B2 | 3/2015 | Kumar et al. |
| 9,104,972 | B1 * | 8/2015 | Korolev ............... G06N 5/048 |
| 2004/0170321 | A1 | 9/2004 | Gong et al. |
| 2007/0022374 | A1 | 1/2007 | Huang et al. |
| 2009/0016599 | A1 | 1/2009 | Eaton et al. |
| 2009/0132510 | A1 * | 5/2009 | Dimitrova ............. G06F 16/739 |
| 2010/0002137 | A1 * | 1/2010 | McKinney ............. G11B 27/28 348/563 |
| 2012/0033949 | A1 | 2/2012 | Lu et al. |
| 2013/0218827 | A1 * | 8/2013 | Harris ................... G06Q 30/02 706/54 |
| 2017/0228591 | A1 * | 8/2017 | Simske .................. G06F 21/64 |
| 2017/0309194 | A1 * | 10/2017 | Simske .................. G06N 20/00 |
| 2018/0018392 | A1 * | 1/2018 | Simske ................ G06F 16/353 |

FOREIGN PATENT DOCUMENTS

| | | |
|---|---|---|
| WO | 2008050649 A1 | 5/2008 |
| WO | 2014058433 A1 | 4/2014 |
| WO | 2015163857 A1 | 10/2015 |

OTHER PUBLICATIONS

Kolekar, M.H. et al ; Sep. 22, 2004; Hidden Markov Model Based Structuring of Cricket Video Sequences Using Motion and Color Features; https://pdfs.semanticscholar.org/0fd6/bcda9a4faa6a341164a6dd46f80bf57c7ad1.pdf?_ga=2.66589996.365208669.1572880625-.

Lu, C. et al.; A 2002 ; An Automatic Video Classification System Based on a Combination of Hmm and Video Summarization ; https://www.eecs.wsu.edu/~cook/pubs/smc08.pdf.

Chong-Wan, N et al. "Automatic video summarization by graph modeling", Proceedings Ninth IEEE Int'l Conf on Computer Vision . (ICCV). Nice, France, Oct. 13-16, 2003; vol. 1, pp. 184-189.

Gokcay, D et al. "Generating titles for paragraphs using statistically extracted keywords and phrases", Systems, Man and Cybernetics, 1995. Intelligent Systems for the 21st Century, IEEE Int'l Conf on Vancouver, BC, Canada Oct. 22-25, 1995, vol. 4, pp. 3174-3179.

Lin, C. "Rouge: A Package for Automatic Evaluation of Summaries", Proceedings of Workshop on Text Summarization 2004, Jul. 21, 2004 (Jul. 21, 2004), p. 1, col. 1, lines 30-39; col. 4, paragraph 13-21.

* cited by examiner

VIDEO CONTENT SUMMARIZATION AND CLASS SELECTION

BACKGROUND

Summaries provide a concise account of the main facts or features of some type of content, such as video content. There are many different approaches to summarize content. Summaries can be used in a wide variety of applications to reduce content into a form more beneficial to a user than the original content.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

One example is directed to a system for performing functional summarization and classification of video content. The system receives video content and filters the video content. The filtered video content is then processed by a plurality of different summarization engines to provide a plurality of summaries. The summaries may be further processed by a plurality of different meta-algorithmic patterns, with each meta-algorithmic pattern being applied to at least two summaries, to provide a plurality of meta-summaries. A meta-summary may be treated as a new summary. For example, a meta-summary may be utilized as input for classification in the same way as an output from a summarization engine.

Meta-summaries are summarizations created by the intelligent combination of two or more standard or primary summaries. The intelligent combination of multiple intelligent algorithms, systems, or engines is termed "meta-algorithmics", and first-order, second-order, and third-order patterns for meta-algorithmics may be defined.

The summaries and/or meta-summaries may be evaluated to determine a value or relevance of each summary and/or meta-summary, respectively, for a selected task. The summarization engine and/or meta-algorithmic pattern that provides a summary and/or meta-summary, respectively, having a significant value or relevance for the selected task is then recommended for deployment. In this way, a summarizer architecture optimized for a particular task is determined.

The system may also identify a class vector for each given class of a plurality of classes of video content, with the class vector being based on information extracted from video content in the given class. A summarization vector may be generated, with the summarization vector being based on summarization information extracted from a meta-summary. Similarity measures of a given video file over each class of video content of the plurality of classes are determined, with each similarity measure being indicative of a similarity between the summarization vector and each class vector. A class of the plurality of classes may be selected based on the determined similarity measures. The given video file may be associated with the selected class of video content.

Some examples are directed to video classification based on functional summarization. Several feature characteristics of a video are extracted, such as individual frames that comprise the video, audio characteristics, and any textual data and/or video characteristics associated with the video. A feature of a video file is motion. Accordingly, a histogram of features may be generated, and differences in these histograms between frames, may be used to create tokenized attributes associated with each video file. In addition, the features may include meta-data associated with a given video file and expert system rules brought in by domain experts.

The features extracted by the summarization engines for a given video file allow a positive identification of creator, author, genre, time-period, etc., for the video file. Video content (e.g., films, TV shows, home videos, etc.) can be classified, and the classification may be utilized to (1) provide viewing recommendations of additional videos (e.g., movies and/or TV shows) that are similar to a given video; and (2) storage recommendations for home videos based on similar types of videos.

Figure 1:
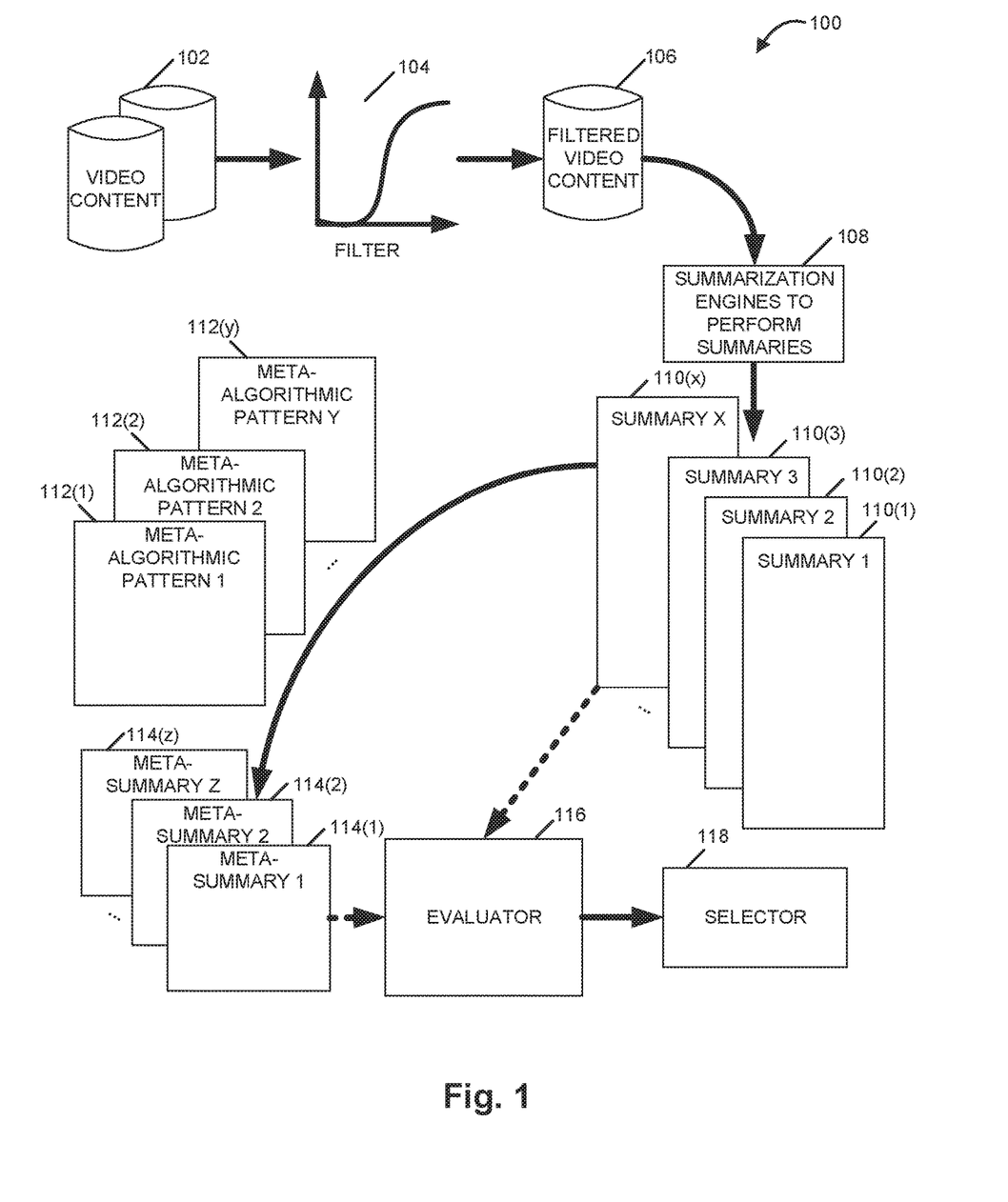
FIG. 1 is a functional block diagram illustrating one example of a system for performing functional summarization and classification of video content.

FIG. 1 is a functional block diagram illustrating one example of a system 100 for performing functional summarization and classification of video content. System 100 includes video content 102, a filter 104, filtered video content 106, summarization engines 108, summaries 110(1)-110(x), meta-algorithmic patterns 112(1)-112(y), meta-summaries 114(1)-114(z), an evaluator 116, and a selector 118, where "x", "y", and "z" are any suitable numbers of summaries, meta-algorithmic patterns, and meta-summaries, respectively. Filter 104 filters video content 102 to provide filtered video content 106 suitable for processing by summarization engines 108. Filter 104 may remove images, sound, video segments, and/or other portions of video content 102 to provide filtered video content 106. In one example, filter 104 is excluded and video content 102 is provided directly to summarization engines 108. In one example, selector 118 is included as part of evaluator 116.

Summarization engines 108 summarize filtered video content 106 to provide a plurality of summaries 110(1)-110(x). In one example, each of the summarization engines provides a summary including at least one of the following summarization outputs:

(1) Image features from each frame of the video, such as lighting (e.g., brightness), objects detected, and colors (e.g., histogram, layout).

(2) Audio features of the video, such as notes and scales features of music, song characteristics (if applicable), musical score characteristics (if applicable), decibel, intensity, speech/speaker detected, audio event detected (e.g., applause, acclaim, scream, crying, explosion, outdoor vs. indoor ambient noise).

(3) Textual features, such as features extracted from a textual transcript of the audio (for example, based on speech recognition, natural language processing (NLP), word cloud, term frequency-inverse document frequency (TF-IDF) for words/phrases. This may help determine use of adult language, profanities, violent language, etc.).

(4) Video characteristics, such as commercial video characteristics (e.g., studio, actors, director, producer, year, genre, etc.), or home video characteristics (e.g., location, timestamp, creator, type of device).

(5) Features determined from gradient vector field techniques based on changes between frames, such as changes in lighting, sound, object movement, etc.).

(6) Some of the above-mentioned features may be additionally extracted and summarized as histograms for frames. Differences between these histograms (from frame to frame) may be determined, and along with the features described above in (1)-(5) may be utilized to create tokenized attributes associated with each video file.

In other examples, a summarization engine may provide a summary including another suitable summarization output.

In one example, the summaries $110(1)$-$110(x)$ are based on tokenized attributes of the video content, such as (1)-(6) listed above, along with meta-data associated with the videos (e.g., location, time, creator, device that captured the video, etc.), plus expert rules brought in by domain experts. These three sets of data may be normalized to correspond to text-like fields, such that each numeric value is converted to a corresponding text description. All data field values may be translated into language-based descriptors. For a given data field, such as image brightness, a range of values for the data field is determined, and the range is divided into a plurality of sub-ranges, with each sub-range represented by and associated with a language-based descriptor. Thus, when a particular numerical value for a given data field is received by the system, the sub-range that contains that numerical value is identified, and the language-based descriptor associated with the identified sub-range is used to represent the numerical value in subsequent processing. This allows summarization to continue on the media representation as a bag of words of the {RANGE_DESCRIPTORS, meta-data, expert rules}. For example, the following attributes may be made "language friendly":

(1) Music intensity: find range, divide range into a suitable subset of subranges, and assign one of the subranges as an attribute: INTENSITY_SUBRANGE_1, INTENSITY_SUBRANGE_2, ..., INTENSITY_SUBRANGE_N.

(2) Brush stroke density: find range of brush stroke densities in {x, y, x+y, x−y}. Divide the range into a suitable set of subranges, and assign one of the subranges as an attribute for each of these four: BSD_X_1, ..., BSD_X_J; BSD_Y_1, ..., BSD_Y_K; BSD_X-Y_1, ..., BSD_X-Y_L; BSD_X+Y_1, ..., BS D_X+Y_M Meta-algorithmic patterns $112(1)$-$112(y)$ are used to summarize summaries $110(1)$-$110(x)$ to provide a plurality of meta-summaries $114(1)$-$114(z)$. Each of the meta-algorithmic patterns is applied to two or more summaries to provide a meta-summary. In one example, the plurality of meta-algorithmic patterns is based on the following approaches:

(1) Voting and Weighted Voting;
(2) Predictive Selection;
(3) Tessellation and Recombination with Expert Decisioner; and
(4) Predictive Selection with Secondary Engines.

In other examples, a meta-algorithmic pattern may be based on another suitable approach.

In the (1) voting and weighted voting approach, the output of multiple summarization engines is combined and relatively weighted based on the relative confidence in each summarization engine and the relative weighting of the items in each summarization. The (2) predictive selection approach may include applying a specific summarization engine or set of summarization engines based on membership within a class associated with a particular topic or set of topics. In the (3) tessellation and recombination with expert decisioner approach, the tessellation reduces the input space to atomic units; the recombination involves a merging step that considers the fully tessellated primitive output data and merges primitive outputs into larger-grained output; and the expert decisioner provides an overall weight for each possible recombined output. In the (4) predictive selection with secondary engines approach, the training or statistical learning is the same as predictive selection, but during run-time, if the first engine selected is shown to provide output with unacceptable quality, then the best remaining engine is iteratively selected.

These four patterns are compared for performance and the one with highest accuracy on training data is chosen as the deployment candidate. Once a classified library of video content is available, the deployed candidate may quickly classify an incoming video data file. In some examples, such a classification may be utilized to provide viewing suggestions to a user (e.g., recommend a similar movie). In some examples, such a classification may be utilized to automatically store/manage/arrange a user's personal video library (e.g., birthday videos, beach vacation videos, etc.).

Evaluator 116 determines a value or relevance of each summary $110(1)$-$110(x)$ and each meta-summary $114(1)$-$114(z)$ for the selected task. In one example, the selected task may include video classification and/or topic identification.

Video classification is assigning video files to specific classes. For a video classification task, the summaries and meta-summaries are evaluated to determine the summarization architecture that provides the video classification that significantly matches the training (i.e., the ground truth) set. Generally, the larger the training set and the larger the number of summarization engines available, the better the final system performance. System performance is optimized, however, when the training set is much larger than the number of summarization engines. The summarization architecture is then selected and recommended for deployment.

Topic identification is related to video classification. Topic identification is a means of filing or otherwise assigning a video element to a class. Identification of the topic or topics is generally associated with selecting from a list or taxonomy. For the topic identification task, the summaries and meta-summaries are evaluated to determine the summarization architecture that provides the highest accuracy association of video elements with a list, dictionary, or taxonomy. The summarization architecture is then selected and recommended for deployment.

In other examples, the selected task may include another suitable application. Each summary and meta-summary is evaluated for its relative value in the selected task. The relative value in the selected task, (i.e., the relevance or utility for the selected task), is evaluated based on a training set (e.g., ground truth set), feedback received from users, or other suitable criteria applicable to the selected task.

Selector 118 selects the summary or meta-summary based on the assessed value, (or utility or relevance), to the selected task to provide recommended deployment settings. In one example, selector 118 selects the summary or meta-summary having the highest assessed value to the selected task to provide recommended deployment settings. In other examples, selector 118 selects the summary or meta-summary having an assessed value over a predefined threshold for the selected task to provide recommended deployment settings. The recommended deployments settings include the summarization engines and/or meta-algorithmic patterns that provide the optimum summarization architecture for the selected task. The optimum summarization architecture can be integrated into a system real-time. The system can be re-configured per preference, schedule, need, or upon the completion of a significant amount of new instances of the tasks.

Figure 2:
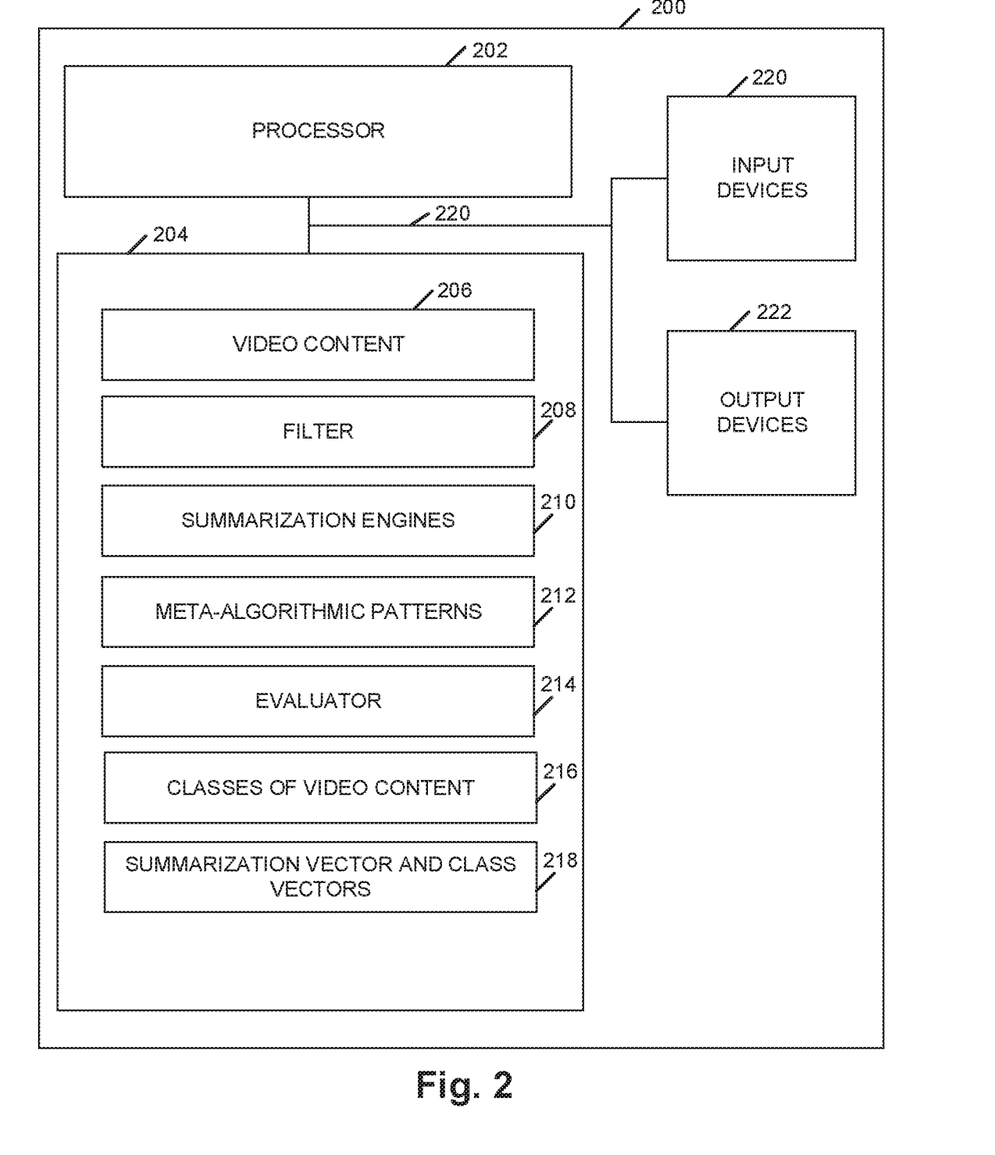
FIG. 2 is a block diagram illustrating one example of a processing system for implementing the system for performing functional summarization and classification of video content shown in FIG. 1.

FIG. 2 is a block diagram illustrating one example of a processing system 200 for implementing system 100 for performing functional summarization and classification of video content. Processing system 200 includes a processor 202, a memory 204, input devices 220, and output devices 222. Processor 202, memory 204, input devices 220, and output devices 222 are communicatively coupled to each other through communication link 220 (e.g., a bus).

Processor 202 includes a Central Processing Unit (CPU) or another suitable processor. In one example, memory 204 stores machine readable instructions executed by processor 202 for operating processing system 200. Memory 204 includes any suitable combination of volatile and/or non-volatile memory, such as combinations of Random Access Memory (RAM), Read-Only Memory (ROM), flash memory, and/or other suitable memory. These are examples of non-transitory computer readable media.

Memory 204 stores video content 206, a plurality of classes of video content 216, and summarization vector and class vectors 218, for processing by processing system 200. Memory 204 also stores instructions to be executed by processor 202 including instructions for a filter 208, summarization engines 210, meta-algorithmic patterns 212, and an evaluator 214. In one example, filter 208, summarization engines 210, meta-algorithmic patterns 212, and evaluator 214 include filter 104, summarization engines 108, meta-algorithmic patterns 112(1)-112(y), and evaluator 116, respectively, as previously described and illustrated with reference to FIG. 1.

Processor 202 executes instructions of filter 208 to filter video content 206 to provide filtered video content. Processor 202 executes instructions of summarization engines 210 to summarize the filtered video content to provide summaries. Processor 202 executes instructions of meta-algorithmic patterns 212 to summarize the summaries to provide meta-summaries. Processor 202 executes instructions of evaluator 214 to evaluate the summaries and meta-summaries to perform functional summarization and classification of video content.

Input devices 220 include a keyboard, mouse, data ports, and/or other suitable devices for inputting information into processing system 200. In one example, input devices 220 are used to input feedback from users for evaluating the summaries and meta-summaries for a selected task. Output devices 222 include a monitor, speakers, data ports, and/or other suitable devices for outputting information from processing system 200. In one example, output devices 222 are used to output summaries and meta-summaries to users, recommend an optimum summarization architecture for a select task, and output a classification for a given video file. In one example, a classification query directed at a particular video file is received via input devices 220. The processor 202 retrieves a class associated with the particular video file, and provides such classification to the user via output devices 222.

The class vectors in vectors 218 are based on the plurality of video content classes 216, with each class vector associated with a respective one of the video content classes 216, and each class vector based on class information extracted from videos in a given class.

The summarization engines and/or meta-algorithmic patterns may be utilized to reduce a given video file to a meta-summary that includes summarization terms. Evaluator 214 generates a summarization vector based on the summarization terms extracted from the meta-summary of the given video file. The summarization vector may then be utilized by evaluator 214 to classify the given video file. The evaluator 214 may determine similarity measures of the given video file over each of the video content classes 216, with each similarity measure being indicative of a similarity between the summarization vector for the given video file and each respective class vector. The given video file may be associated with the class for which the similarity between the summarization vector for the given video file and the class vector is maximized.

In one example, functional summarization is used in two steps. First, functional summarization is used to classify a corpus of video content. Such a classification according to one example provides a more refined genre for movies. Instead of a coarse classification in terms of "horror", "suspense", "kids", and so forth, examples disclosed herein cluster video content based on finer features, including sound and image quality, type of action (e.g., fast-paced, gun violence, romantic musical), type of home video (e.g., "Birthday video", "golf outing", "beach video", etc.). Secondly, functional summarization may be used to classify an incoming video by associating it with a predetermined class or cluster. Such an association may be utilized to: (1) provide viewing recommendations similar to a movie and/or TV show; and (2) provide storage recommendations for home videos based on similar types of videos.

Figure 3:
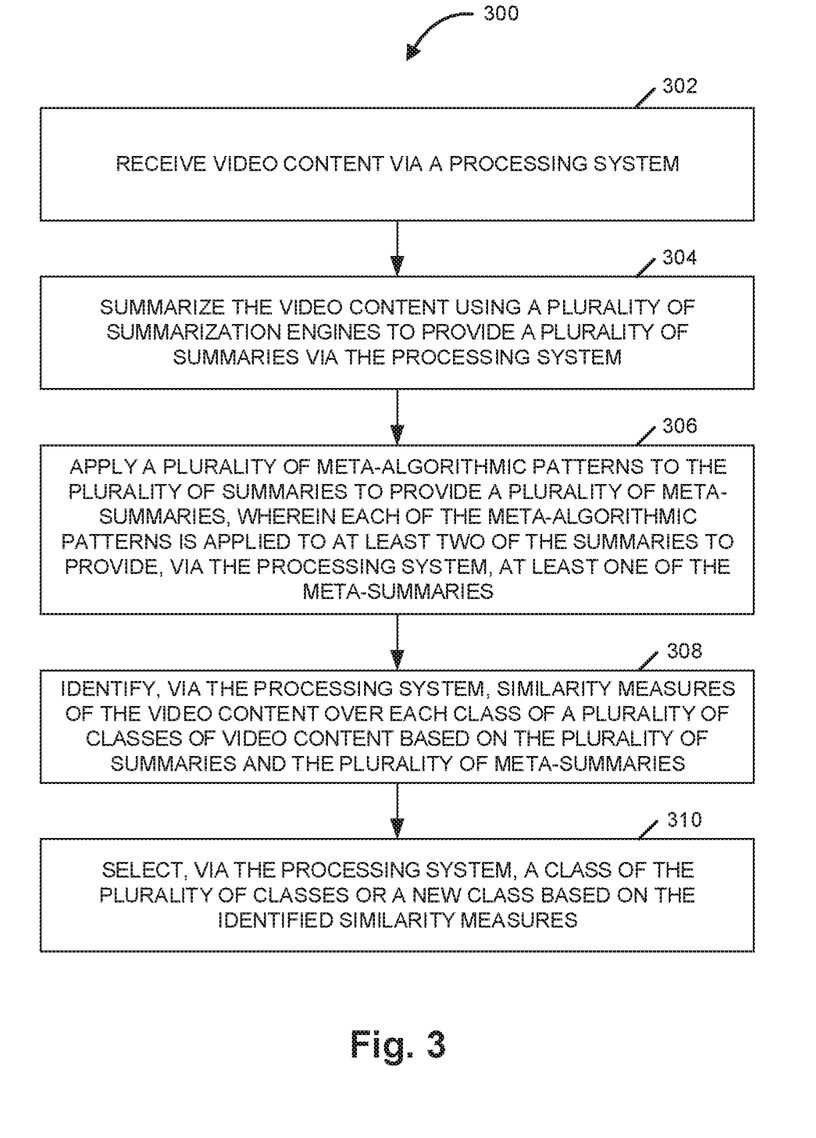
FIG. 3 is a flow diagram illustrating one example of a method to classify video content based on meta-algorithmic patterns.

One example is directed to a method for classifying video content. FIG. 3 is a flow diagram illustrating one example of a method 300 to classify video content based on meta-algorithmic patterns. At 302, video content is received via a processing system. At 304, the video content is summarized using a plurality of summarization engines to provide a plurality of summaries via the processing system. At 306, a plurality of meta-algorithmic patterns is applied to the plurality of summaries to provide a plurality of meta-summaries, wherein each of the meta-algorithmic patterns is applied to at least two of the summaries to provide, via the processing system, at least one of the meta-summaries. At 308, the method identifies, via the processing system, similarity measures of the video content over each given class of a plurality of classes of video content based on the plurality of summaries and the plurality of meta-summaries. At 310, the method selects, via the processing system, a class of the plurality of classes based on the identified similarity measures.

In an example of the method 300, at least one of the summaries includes tokenized attributes extracted from the video content, meta-data associated with the video content, and expert system rules for the video content, and the method further includes converting numeric values in the tokenized attributes, the meta-data, and the expert system rules, into text-based descriptors.

Another example is directed to a system that includes a plurality of summarization engines, each summarization engine to receive video content, via a processing system, and to provide a summary of the video content, thereby providing a plurality of summaries of the video content. The system includes a plurality of meta-algorithmic patterns, each meta-algorithmic pattern to be applied to at least two of the summaries to provide, via the processing system, a meta-summary of the video content using the at least two summaries, thereby providing a plurality of meta-summaries of the video content. The system includes an evaluator to evaluate the plurality of summaries and the plurality of meta-summaries and to determine similarity measures of the video content over each given class of a plurality of classes of video content, and to select a class of the plurality of classes based on the determined similarity measures.

At least one of the summarization engines may output image features, audio features, and textual features from speech recognition, based on the video content. At least one of the summarization engines may output features determined from gradient vector field techniques based on changes between frames of the video content. At least one of the summarization engines may output histograms for frames of the video content, and frame to frame differences between the histograms. At least one of the summarization engines may output tokenized attributes extracted from the video content, meta-data associated with the video content, and expert system rules for the video content. At least one of the summarization engines may convert numeric values associated with the video content into text-based descriptors. The converting numeric values into text-based descriptors may include determining a range associated with a given numeric value, dividing the range into sub-ranges, and associating a text-based descriptor with each of the sub-ranges. The plurality of meta-algorithmic patterns may include voting and weighted voting, predictive selection, tessellation and recombination with expert decisioner, and predictive selection with secondary engines. The evaluator may provide a viewing recommendation for additional video content based on the selected class. The evaluator may provide a storage recommendation based on the selected class.

Another example is directed to a non-transitory computer readable medium comprising executable instructions to: receive video content; apply a plurality of combinations of meta-algorithmic patterns and summarization engines, wherein: each summarization engine provides a summary of the video content, and each meta-algorithmic pattern is applied to at least two summaries to provide a meta-summary; generate a summarization vector based on summarization terms extracted from the meta-summary; generate a class vector for each given class of a plurality of classes of video content, the class vector based on class terms extracted from videos in the given class; determine similarity measures of the video content over each class of video content of the plurality of classes, each similarity measure indicative of a similarity between the summarization vector and each class vector; and select a class of the plurality of classes based on the determined similarity measures.

The non-transitory computer readable medium may further comprise executable instructions to: output a set of features from at least one of the summarization engines, wherein the set of features includes at least one of: (1) features determined from gradient vector field techniques based on changes between frames of the video content, and (2) histograms for frames of the video content and frame to frame differences between the histograms.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A system comprising:
a plurality of summarization engines, each summarization engine to receive video content, via a processing system, and to provide a summary of the video content, thereby providing a plurality of summaries of the video content;
a plurality of meta-algorithmic patterns, each meta-algorithmic pattern to be applied to at least two of the summaries to provide, via the processing system, a meta-summary of the video content using the at least two summaries, thereby providing a plurality of meta-summaries of the video content; and
an evaluator to evaluate the plurality of summaries and the plurality of meta-summaries and to determine similarity measures of the video content over each given class of a plurality of classes of video content, and to select a class of the plurality of classes based on the determined similarity measures.

2. The system of claim 1, wherein at least one of the summarization engines outputs image features, audio features, and textual features from speech recognition, based on the video content.

3. The system of claim 1, wherein at least one of the summarization engines outputs features determined from gradient vector field techniques based on changes between frames of the video content.

4. The system of claim 1, wherein at least one of the summarization engines outputs histograms for frames of the video content, and frame to frame differences between the histograms.

5. The system of claim 1, wherein at least one of the summarization engines outputs tokenized attributes extracted from the video content, meta-data associated with the video content, and expert system rules for the video content.

6. The system of claim 1, wherein at least one of the summarization engines converts numeric values associated with the video content into text-based descriptors.

7. The system of claim 6, wherein the converting numeric values into text-based descriptors includes determining a range associated with a given numeric value, dividing the range into sub-ranges, and associating a text-based descriptor with each of the sub-ranges.

8. The system of claim 1, wherein the plurality of meta-algorithmic patterns includes voting and weighted voting, predictive selection, tessellation and recombination with expert decisioner, and predictive selection with secondary engines.

9. The system of claim 1, wherein the evaluator provides a viewing recommendation for additional video content based on the selected class.

10. The system of claim 1, wherein the evaluator provides a storage recommendation based on the selected class.

11. A method to classify video content based on meta-algorithmic patterns, the method comprising:
receiving the video content via a processing system;
summarizing the video content using a plurality of summarization engines to provide a plurality of summaries via the processing system;

applying a plurality of meta-algorithmic patterns to the plurality of summaries to provide a plurality of meta-summaries, wherein each of the meta-algorithmic patterns is applied to at least two of the summaries to provide, via the processing system, at least one of the meta-summaries;

identifying, via the processing system, similarity measures of the video content over each given class of a plurality of classes of video content based on the plurality of summaries and the plurality of meta-summaries; and selecting, via the processing system, a class of the plurality of classes based on the identified similarity measures.

12. The method of claim 11, wherein at least one of the summaries includes tokenized attributes extracted from the video content, meta-data associated with the video content, and expert system rules for the video content.

13. The system of claim 12, and further comprising:
converting numeric values in the tokenized attributes, the meta-data, and the expert system rules, into text-based descriptors.

14. A non-transitory computer readable medium comprising executable instructions to:
receive video content;
apply a plurality of combinations of meta-algorithmic patterns and summarization engines, wherein: each summarization engine provides a summary of the video content, and each meta-algorithmic pattern is applied to at least two summaries to provide a meta-summary;
generate a summarization vector based on summarization terms extracted from the meta-summary;
generate a class vector for each given class of a plurality of classes of video content, the class vector based on class terms extracted from videos in the given class;
determine similarity measures of the video content over each class of video content of the plurality of classes, each similarity measure indicative of a similarity between the summarization vector and each class vector; and
select a class of the plurality of classes based on the determined similarity measures.

15. The non-transitory computer readable medium of claim 14, and further comprising executable instructions to:
output a set of features from at least one of the summarization engines, wherein the set of features includes at least one of: (1) features determined from gradient vector field techniques based on changes between frames of the video content, and (2) histograms for frames of the video content and frame to frame differences between the histograms.

* * * * *

UNITED STATES PATENT AND TRADEMARK OFFICE
CERTIFICATE OF CORRECTION

PATENT NO. : 10,521,670 B2  
APPLICATION NO. : 15/764280  
DATED : December 31, 2019  
INVENTOR(S) : Steven J Simske et al.

Page 1 of 1

It is certified that error appears in the above-identified patent and that said Letters Patent is hereby corrected as shown below:

On the Title Page

In Column 1, item (72), Inventors, Line 1, delete "CA" and insert -- CO --, therefor.

In the Claims

In Column 9, Line 18 (approx.), Claim 13, delete "system" and insert -- method --, therefor.

Signed and Sealed this  
Twenty-fifth Day of February, 2020

Andrei Iancu  
*Director of the United States Patent and Trademark Office*